United States Patent [19]

McLaren

[11] Patent Number: 5,033,991
[45] Date of Patent: Jul. 23, 1991

[54] AUTOMATIC DERAILLEUR SHIFTER

[76] Inventor: Michael J. McLaren, P.O. Box 73, Tyndall, Manitoba, Canada, R0E 2B0

[21] Appl. No.: 535,602

[22] Filed: Jun. 11, 1990

[51] Int. Cl.$^5$ ............................................. F16H 11/08
[52] U.S. Cl. ........................................ 474/78; 474/80
[58] Field of Search ............................ 474/70, 78–82; 280/236, 238; 74/594.4

[56] References Cited

U.S. PATENT DOCUMENTS

| | | | |
|---|---|---|---|
| 3,769,848 | 11/1973 | McGuire | 474/70 |
| 3,831,978 | 8/1974 | Dunder et al. | 280/238 |
| 3,929,025 | 12/1975 | Perry | 474/70 |
| 4,061,046 | 12/1977 | Lang | 474/70 |
| 4,343,613 | 8/1982 | Leiter et al. | 474/82 |
| 4,504,250 | 3/1985 | Juy | 474/80 |
| 4,599,079 | 7/1986 | Chappell | 474/80 |
| 4,781,663 | 11/1988 | Reswick | 474/49 |
| 4,840,605 | 6/1989 | Testa | 474/80 |

FOREIGN PATENT DOCUMENTS

3727609A1 3/1989 Fed. Rep. of Germany .

*Primary Examiner*—Thuy M. Bui
*Attorney, Agent, or Firm*—Adrian D. Battison; Stanley G. Ade; Murray E. Thrift

[57] ABSTRACT

An automatic derailleur shifter system for example for a bicycle includes a hub to which is attached a chain wheel set and a derailleur system for moving the chain associated therewith from chain wheel to chain wheel for a gear changing system. Within the hub associated with the chain wheels is provided an automatic changing system including a member coupled to the chain wheel set which carries a helical screw cooperating with a sleeve slidable axially within the hub and cooperating with the screw so that rotation of the screw relative to the sleeve causes the sleeve to move axially. Axial movement of the sleeve is inhibited by a spring and rotational movement of the sleeve is prevented by engagement with the hub. Thus variations in the torque applied from the chain set to the hub through the screw in the sleeve cause axial movement of the sleeve which actuates change of the gears by moving to the derailleur set. The spring can be internal to the hub or can be provided outside of the hub. In addition movement of the sleeve can cause rotational movement of a second screw member at an opposed end of the hub which can be used to change a front chain wheel set at the pedals.

20 Claims, 5 Drawing Sheets

AUTOMATIC DERAILLEUR SHIFTER

BACKGROUND OF THE INVENTION

This invention relates to an automatic derailleur shifter system for a vehicle which is a bicycle which includes a pedal powered chain wheel which drives through a chain one of a set of driven sprockets attached to a drive wheel of the vehicle.

Most bicycle gear systems now use a derailleur system which includes an idler gear mounted upon a spring system which tensions the chain and acts to move the chain to a selected one of a set of driven sprockets. The derailleur system has become over the years very finely tuned and now generally includes also a locator arrangement which ensures that the changing mechanism is properly positioned at one of the driven sprockets of the set in preference to intermediate positions. In addition the gear chain system often includes two or even three chain wheels at the drive end which are attached to the pedal arrangement together with a changer system which moves the chain across between the drive sprockets. Some systems have now reached the complexity of having twenty one possible change combinations provided by three drive sprockets at the forward end and seven driven sprockts at the rear hub. The systems are changed by a simple lever arrangement which pulls upon a cable to move the front chain system or the derailleur system at the option of the rider. The rider is therefore faced with a wide variety of possibilities and only the most experienced and enthusiastic of riders can control the gear system sufficiently to maintain the pedal pressure or torque within the relatively narrow range which is preferred.

Attempts have been made over many years to provide an automatic change system which detects the amount of torque or pressure applied to the pedals and then changes the gear ratio automatically to attempt to maintain the torque within relatively narrow band.

Various arrangements are shown in U.S. Pat. Nos. 3,929,025 (Perry); 4,599,079 (Chappell); 3,831,978 (Dunder); 4,781,663 (Reswick); 4,061,046 (Lang); 4,343,613 (Leiter) and 3,769,848 (McGuire).

Most of these arrangements provide highly complex detection systems including additional elements mounted on the bicycle for detecting the tension in the chain or additional elements for detecting the pressure at the pedals.

The McGuire patent provides a relatively simple device in which the sprocket set is caused to move axially of the rear axle by a screw thread coupling on an inner surface of the sprocket set and outer surface of the axle. On the face of it this arrangement is relatively simple but it requires a significant modification of the structure of the bicycle so that the sprocket set is arranged on the outside of the forks rather than on the inside as is the conventional arrangement. The device cannot therefore be simply attached to an existing bicycle and major modifications to the bicycle or a special bicycle are necessary.

In any event none of the devices proposed has had any significant impact on the marketplace and basically no automatic shifting arrangement is currently available.

SUMMARY OF THE INVENTION

According to the invention, therefore there is provided a pedal powered vehicle comprising a driven wheel having a wheel hub and an axle on which the hub is mounted for rotation but an axis defined by the axle, a sprocket set including a plurality of coaxial axially spaced driven chain sprockets mounted on the hub for communicating drive thereto, drive sprocket means, pedal means for providing rotational movement to the drive sprocket means, a chain for communicating rotational movement of the drive sprocket means to a selected one of the driven chain sprockets for driving the hub, a derailleur device mounted adjacent the chain sprockets for tensioning the chain and for effecting a gear change by movement of the chain axially of the hub so as to cooperate with each of the chain sprockets when selected, an automatic gear shifting means comprising means defining a hollow interior of the hub, sprocket support means supporting the sprocket set arranged for rotation therewith about the axis in a drive direction and for limited rotation relative to the hub in both the drive direction and in a direction opposed to said drive direction, said sprocket set support means including a portion thereof into said hollow interior, torque communicating means mounted within said hollow interior for communicating torque from the projecting portion of the sprocket support means in a drive direction to the hub, said torque communicating means including spring means arranged to resist said limited rotation of the sprocket support means relative to the hub such that the amount of said movement is proportional to the value of the torque, and gear change means responsive to said movement arranged to move said derailleur device to effect said gear change.

The device is therefore mounted substantially wholly within the rear hub enabling the device to simply be installed in an existing bicycle frame and cooperate with the existing derailleur system while providing an effective control over the derailleur gear change so as to maintain the torque applied by the rider within a reasonable band.

Preferably the device is arranged also to operate the front drive sprocket gear chain system so that the device can move through a whole range of gears from the highest to the lowest depending upon the amount of torque applied by the rider.

Preferably the spring device resisting the movement is provided externally of the hub so that it is adjustable by simple manual operation for different weight of rider.

Preferably the movement is in an axial direction so as to operate a wire cable mounted within a hollow interior of the axle by moving the wire cable axially.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
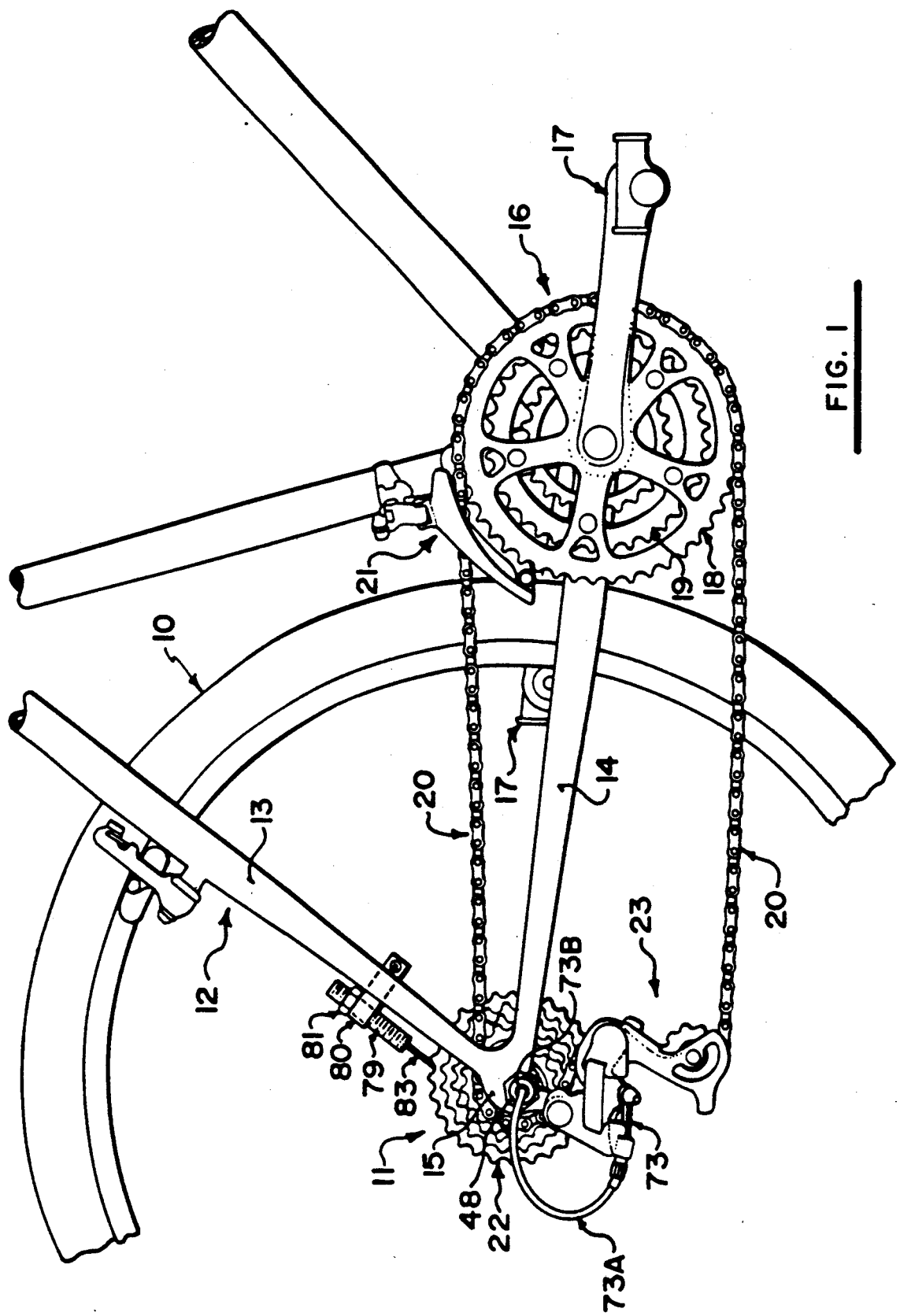
FIG. 1 is a side elevational view of a portion of a bicycle showing the drive system.

The bicycle of FIG. 1 comprises a rear wheel 10 including a hub generally indicated at 11. The hub is mounted in rear forks 12 including an upwardly inclined portion 13 and a downwardly inclined portion 14 of a conventional frame arrangement. The hub is clamped in a C-shaped bracket 15 at the apex between the portions 13 and 14.

A front chain wheel for driving the rear wheel is indicated at 16 and is connected to a conventional pedal system indicated at 17. The chain wheel system includes a plurality of sprockets 18 and 19 which are arranged coaxially around the axis of the pedals 17 and axially spaced in conventional manner. A chain 20 cooperates with the chain wheel system and is movable by a conventional gear changing system indicated at 21 which can transer the chain from the largest chain wheel as shown to one or more of the smaller chain wheels (only partly visible).

The hub carries a sprocket set 22 again of conventional construction with the sprockets of the set arranged coaxially and axially spaced so that the chain can move from one to the next under actuation by a derailleur system schematically indicated at 23.

The parts illustrated in FIG. 1 are generally of conventional nature and are modified by the device as described hereinafter particularly in relation to FIG. 2.

Figure 3:
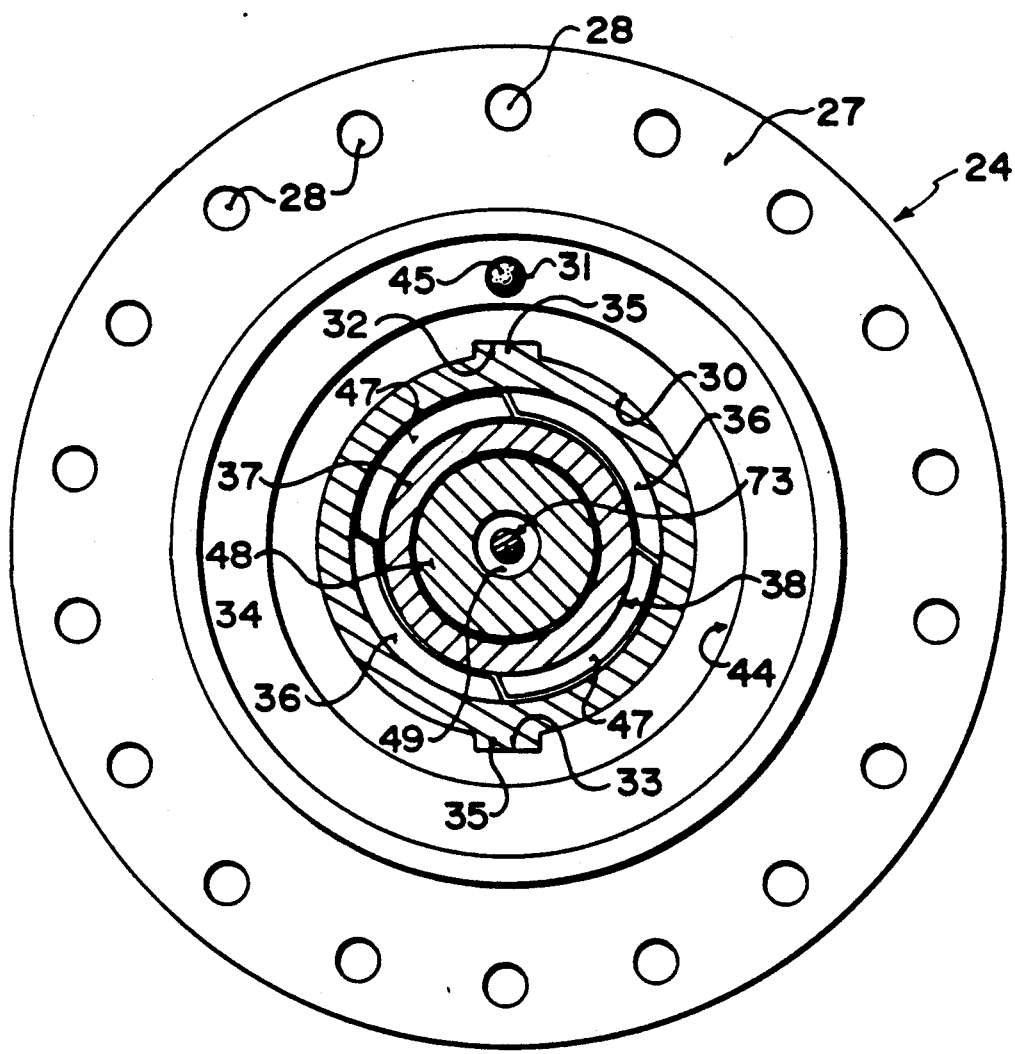
FIG. 3 is a cross-sectional view along the lines 3—3 of FIG. 2.

The hub generally indicated at 11 includes an outer hub portion 24 in the form of a sleeve having a hollow interior 25. On an outer surface of the hub is provided a pair of axially spaced annular flanges 26 and 27 which include holes 28 as best shown in FIG. 3 for connection to spokes which support the outer rim of the wheel 10.

The inner surface defining the hollow interior includes a larger portion 29 adjacent the left hand end of the outer hub portion and a larger counterboard portion 30 toward the right hand end of the hub portion. A single bore 31 extends axially of the hub portion at a position outside the smaller portion 30. The smaller portion 30 includes a pair of keyways 32 and 33 extending axially of the hub portion at 180° spacing as best shown in FIG. 3.

Inside the smaller portion 30 is mounted a sleeve member 34 having lengths substantially equal to the length of the smaller portion 30. The sleeve 34 has on its outer surface a pair of ribs extending axially and arranged for cooperation with the keyways 32 and 33, the ribs being indicated at 35. This allows the sleeve to move axially relative to the hub portion but it is constrained to rotate with the hub portion by the cooperation with the ribs and the keyways. An inner surface of the sleeve 34 includes a female screw thread 36 defined by relatively wide bands of rectangular shape.

Inside the sleeve is mounted an axially extending extension portion 37 of the sprocket set support member 38. The sprocket set support member includes an annular support surface 39 on which the sprocket set (not shown) is mounted together with a free wheel arrangement which allows the sprocket set to drive forward motion of the support member but to freewheel in the reverse direction. Forwardly of the support surface 39 is a flange member 40 which carries on a inwardly facing surface 41 thereof, a bearing support portion 42 for receiving balls 43 of a bearing element cooperating between an outer surface of the hub portion as indicated at 44 and the inner surface of the support member 38. The bearings 43 thus allow limited rotation between the support member 38 and the hub portion 24. This movement is to some extent controlled by a ball 45 biased forwardly of the bore 31 by a spring 46 which cooperates with a plurality of indentations on the inner surface of the flange 40. Thus the support member is constrained to rotate through a limited amount relative to the hub portion through discrete steps defined by the location of the ball 45 within the recesses.

The axially extended portion 37 includes an outer male screw thread 47 shaped to cooperate with the female screw thread on the sleeve 34. The screw thread has a relatively large helix angle so that rotation of the support member 38 relative to the hub portion through an angle less than 180° causes movement of the sleeve 34 in an axial direction to its fullest extent.

Inside the support member 34 is provided the axle 48 including a hollow continuous bore 49 along the length thereof. The outer surface of the axle 48 includes a screw threaded section 50 at each end for cooperation with a nut 51. Inside the screw threaded portion 50 is a first cylindrical portion 52 followed by a second cylindrical portion 53 and followed by a square portion 54. A slot 55 is found in the square portion and extends through the square portion to cooperate with the channel 49.

A cone member 56 surrounds the portion 52 of the axle and defines a bearing receiving section 57 which presses bearing assembly 58 against a surface 59 of the support member 38. Thus the main bearings defined by the bearing 58 allow the support member to rotate freely relative to the cone and thus relative to the axle to which the cone is clamped by the lock nut 51. In conventional manner the bracket portion of the forks of the frame of the bicycle is clamped between the lock nut 51 and an outer wheel nut (not shown).

Figure 4:
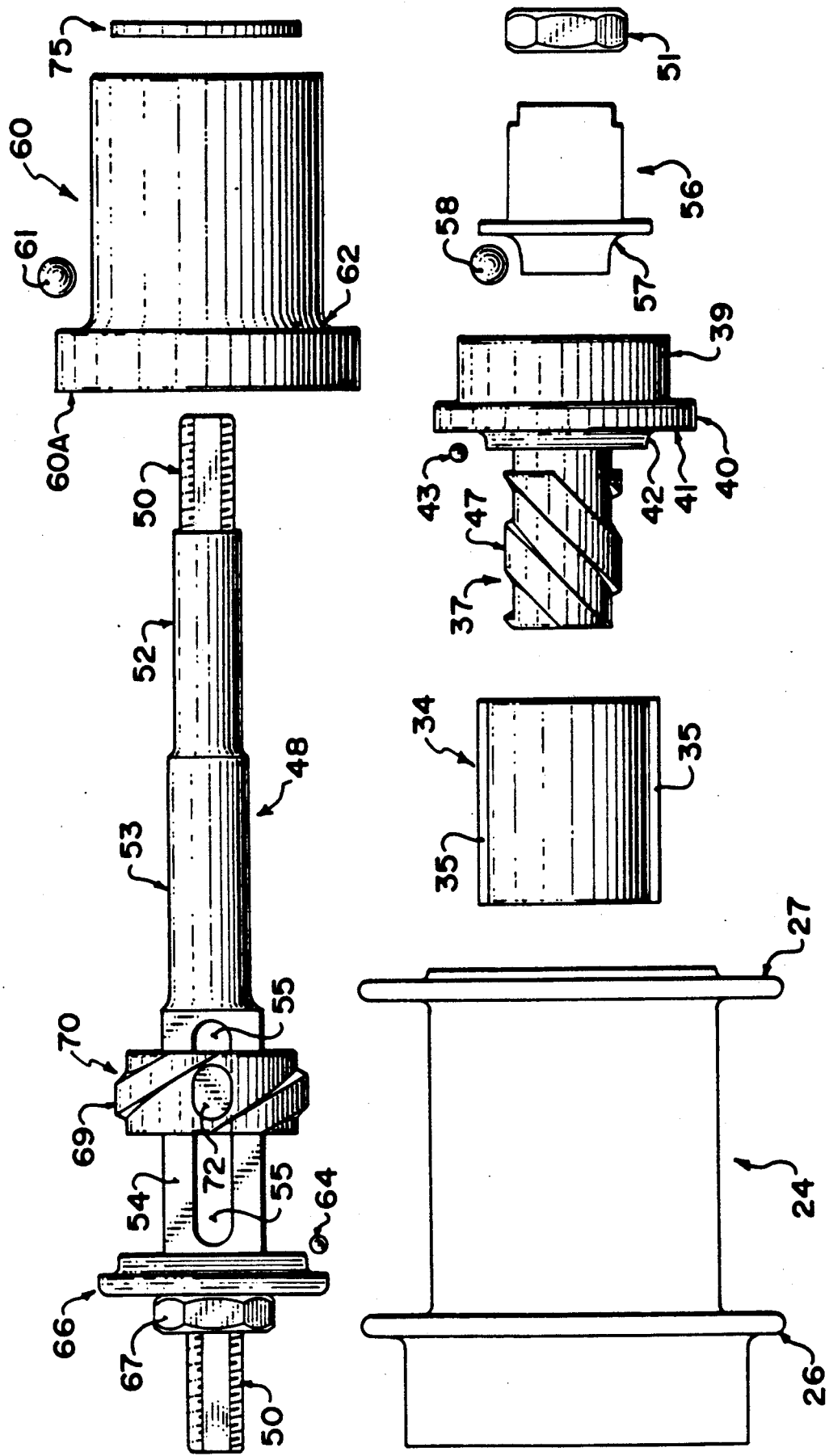
FIG. 4 is an exploded view of the parts of the hub of FIG. 2.

Inside the larger portion of the hollow interior of the hub portion is provided a sleeve member 60 which is free to rotate relative to the hub portion on bearing 61 defined between surfaces 62 and 63 of the sleeve member and the hub portion respectively. The bearing 61 again defines the main bearing for rotation of the hub relative to the axle. The sleeve member 60 is free to rotate relative to the axle on subsidiary bearings 64 defined between an end surface of the sleeve member indicated at 65 and a cone member 66 clamped to the axle by a nut 67 applied on the threaded portion 50. The sleeve member 60 has a female screw thread 68 on the internal surface thereof which cooperates with a male screw thread on the outer surface 69 of a second member 70. The second member as best shown in FIG. 4 cooperates with a square portion 54 of the axle so that it can move axially along the axle but is prevented from rotation of the axle by the square section and also by a transverse pin 72 which passes into the slot 55 and engages a cable 73 extending along the hollow channel 49 of the axle. The cable 73 is thus moved axially along the channel as the second member 70 is forced axially. The cable includes a cable casing 73A inserted into the axle and stabilized by an indent 73B. The cable further includes a cable head 73D received within an indent 73C in the pin 72. A replacement cable can be threaded axially of the axle from the left hand end.

Figure 5:
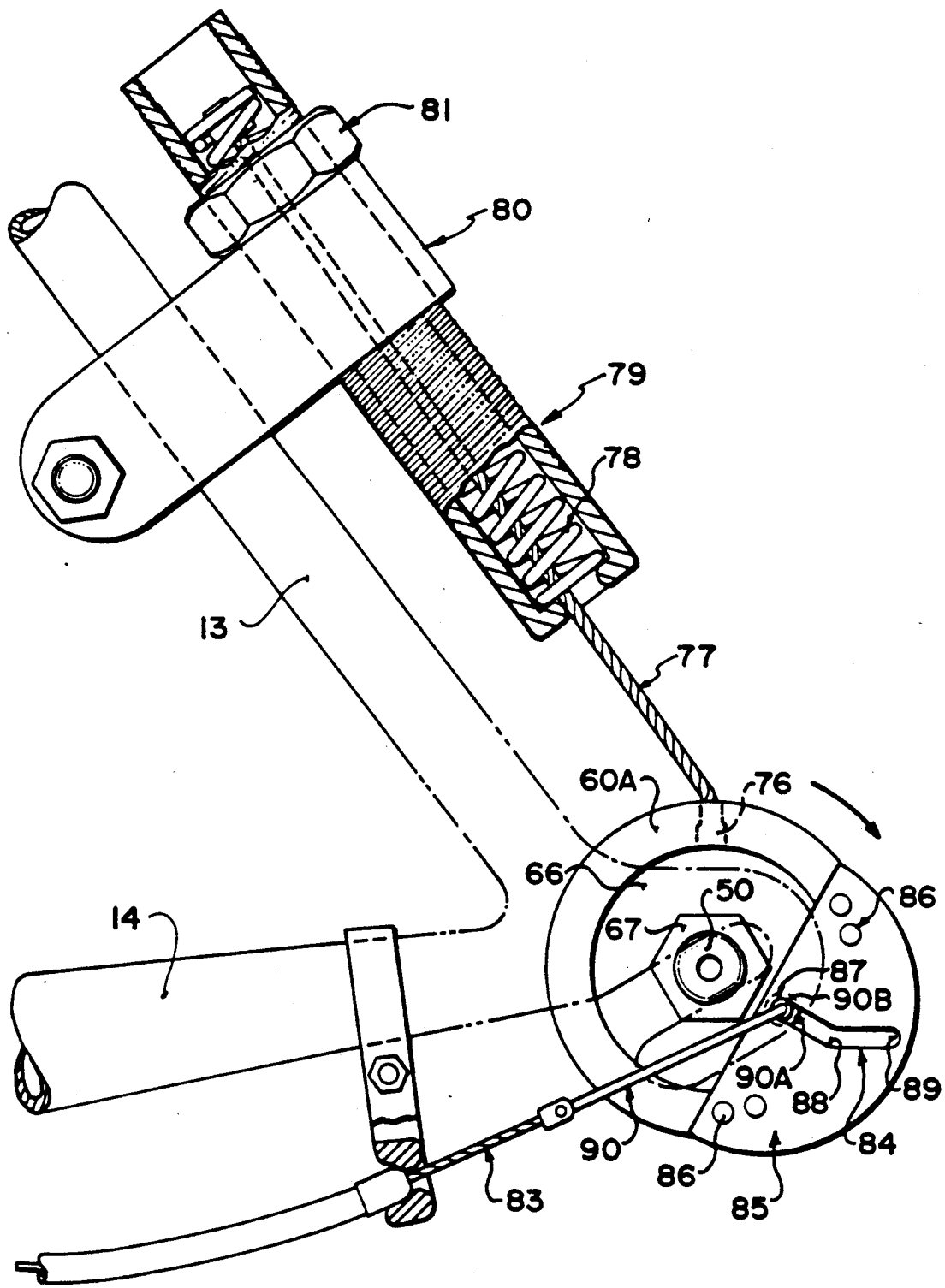
FIG. 5 is a side elevational view of the opposed side of the bicycle showing only the area adjacent the rear hub and on an enlarged scale.

An end face of the second member 70 carries a thrust bearing 75 which engages an end face of the sleeve 34. The sleeve 34 rotates with the hub whereas the second member 70 is held stationary relative to the axle and thus the thrust bearing takes up the rotation and communicates force between the second member 70 and the sleeve 34. Axial movement of the sleeve 34 thus forces the second member 70 axially. The cooperation between the outside screw thread 69 and the inside screw thread 68 on the sleeve member 60 causes the sleeve member to rotate in a clockwise direction as best shown in FIG. 5. In this figure an annular end flange portion 60A of the sleeve 60 is exposed at the end of the hub opposite to the sprocket set and this acts as a control member for the automatic changing system.

In particular the flange 60A is attached to a nipple 76 carried on the end of a wire 77 attached to a spring 78. The spring 78 is mounted within a sleeve 79 connected onto the upwardly inclined fork portion 13 by a bracket 80. The tension on the spring can be adjusted by a nut 81 which causes the sleeve 79 to be moved longitudinally of the wire 77. The spring 78 thus provides a resisting force to the rotation of the flange 60A and thus to the axial movement of the second member 70.

Figure 2:
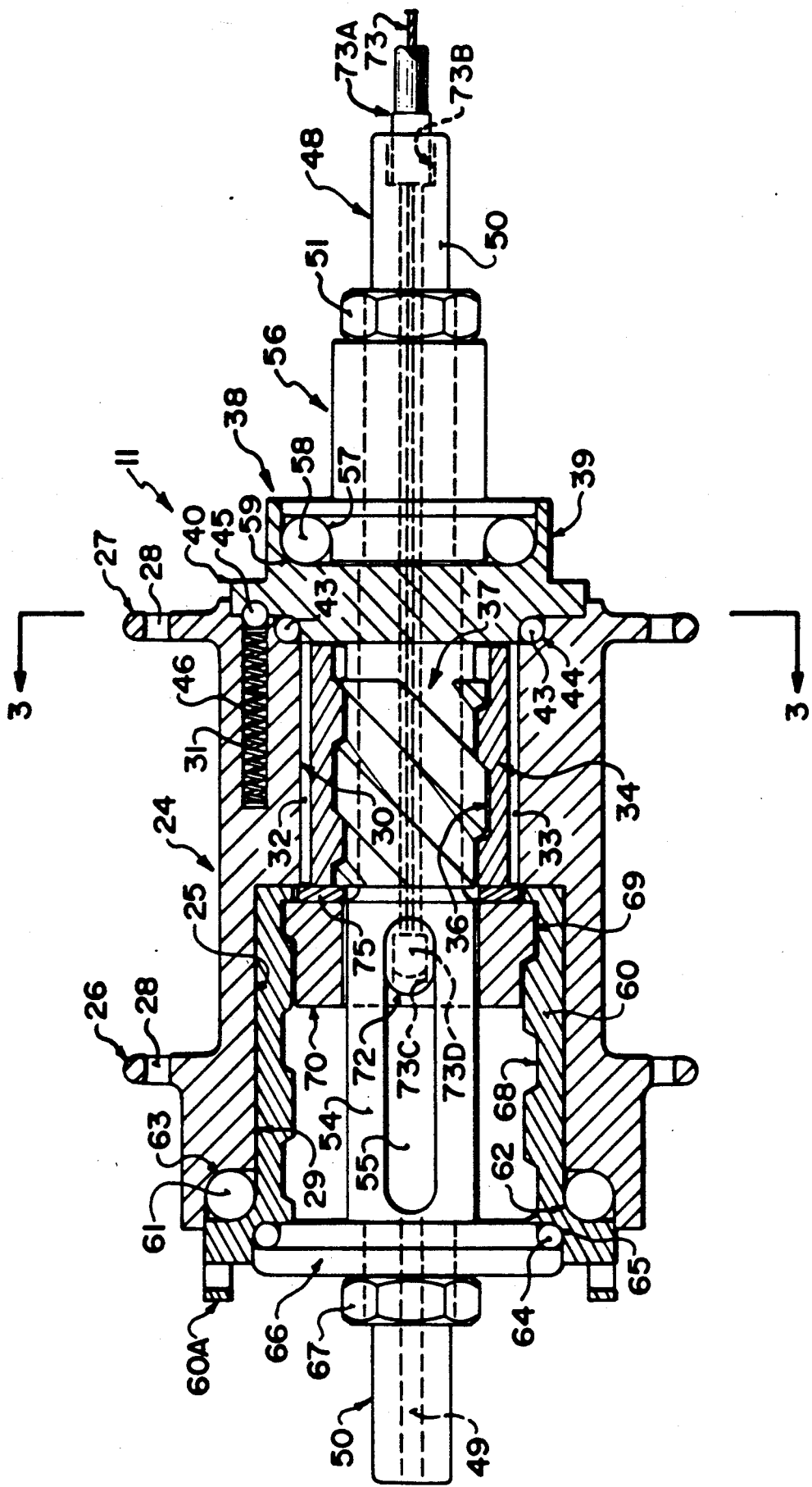
FIG. 2 is a cross-sectional view through the hub of the rear wheel of the bicycle of FIG. 1.

In operation of this portion of the device, the torque applied to the sprocket set by the chain causes a movement of the support member in a drive direction relative to the hub thus forcing the sleeve 34 in an axial direction toward the left as shown in FIG. 2. This movement is resisted by the spring 78 so that a balance is obtained in which the amount of torque applied is maintained within limits controlled by the spring. As the torque tends to increase, the sleeve 34 moves to the left and this acts to move the wire cable 73 to the left thus pulling the cable 73 to actuate the gear change mechanism of the derailleur 23. Automatically therefore the gear change is actuated toward a lower gear as the torque increases.

The amount of torque necessary to change gear can be varied by adjusting the effect of the spring 78 in accordance with the weight of the rider.

The front change mechanism 21 of the chain wheel set 16 is actuated by a cable 83 shown in FIG. 5. The cable is controlled by a v-shaped camtrack 84 defined in a plate 85 carried by the annular flange 60A. The plate is attached to the flange 60A by rivets 86 so as to stand outwardly to one side and lying in a plane of the front face of the flange 60A. The v-shaped camtrack 84 has a bottom end 87, a base of the Y-shape indicated at 88 at an opposed end 89. The device is constrained by the ratio of the helix angle of the screw threads so that the plate moves through an angle of the order of 90°. As the plate thus moves in a clockwise direction through 45°, a rigid wire connector 90 mounted at the end of the wire 83 and including a right angle arm 90B and head 90A slides along the cam track 84 to the base position 88 allowing the spring action (not shown) at the front change mechanism 21 to cause the chain mechanism to allow the chain to move into position on an intermediate one of the three chain wheels at the chain wheel set. The head 90A of the wire connector runs against a rear face of the cam plate 85. The extended state of the front derailleur is arranged such that it positions the chain on the largest sprocket for high gear operation. Furthermore as the plate 85 is moved from the 45° position to the 90° position, the nipple 90 moves to the outer end 89 of the v-shaped camtrack which at this time has moved in the clockwise direction so that the cable is further released allowing the spring at the change mechanism to cause the chain to move the smallest of the chain wheels.

The device is thus set up so that in operation the change mechanism at the sprocket set causes the change firstly from the first to the third of the drive sprockets following which a change occurs at the front chain wheel from the first to the second chain wheel. The device then causes, as the torque further increases, a change from the third to the fifth of the drive sprockets. Subsequently the front change mechanism causes a change from the second to the third of the chain wheels. Finally the device is arranged to cause a change from the fifth to the seventh of the drive sprockets.

The device therefore provides an automatic change system which can act both on the rear and the front change systems and is mounted substantially wholly at or within the hub enabling the device to be replaced into a conventional bicycle using the conventional chain system 21 and a conventional derailleur system 23.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A pedal powered vehicle comprising a driven wheel having a wheel hub and an axle on which the hub is mounted for rotation about an axis defined by the axle, a sprocket set including a plurality of coaxial axially spaced driven chain sprockets mounted on the hub for communicating drive thereto, drive sprocket means, pedal means for providing rotational movement to the drive sprocket means, a chain for communicating rotational movement of the drive sprocket means to a selected one of the driven chain sprockets for driving the hub, a derailleur device mounted adjacent the chain sprockets for tensioning the chain and for effecting a gear change by movement of the chain axially of the hub so as to cooperate with each of the chain sprockets when selected, an automatic gear shifting means comprising means defining a hollow interior of the hub, sprocket support means supporting the sprocket set arranged for rotation therewith about the axis in a drive direction and for limited rotation relative to the hub in both the drive direction and in a direction opposed to said drive direction, said sprocket set support means including a projecting portion thereof projecting into said hollow interior, torque communicating means mounted within said hollow interior for communicating torque from the projecting portion of the sprocket support means in a drive direction to the hub, said torque communicating means including spring means arranged to resist said limited rotation of the sprocket support means relative to the hub such that the amount of said movement is proportional to the value of the torque, and gear change means responsive to said movement arranged to move said derailleur device to effect said gear change.

2. The invention according to claim 1 including a member movable axially in response to said movement, said member being operable to cause movement of said gear change means.

3. The invention according to claim 2 wherein the axle includes a hollow interior with an opening through one side portion thereof and wherein there is provided means for communicating axial movement of said member to a member extending axially of said axle within the hollow interior thereof.

4. The invention according to claim 2 wherein the member includes screw thread means thereon cooperating with screw thread means on the projecting portion for causing said axial movement of said member.

5. The invention according to claim 4 wherein the member comprises a sleeve surrounding the axially projecting portion of the sprocket set support means, said screw thread means comprising a male screw thread on an exterior surface of the projecting portion and a female screw thread on an interior surface of the sleeve.

6. The invention according to claim 5 wherein the sleeve includes on an outer surface thereof means for communicating torque from the axially projecting portion to a surface of the hub defining said hollow interior, said means on the exterior surface allowing said axial movement of the sleeve relative to said hollow interior of the hub.

7. The invention according to claim 6 including main rotational bearing means provided between the sprocket set support means and a bearing support member on the axle and supplementary bearing means between said sprocket set support means and said hub.

8. The invention according to claim 4 wherein said axial movement of said member causes movement of a second member axially movable along the axle but held against rotational movement relative to the axle.

9. The invention according to claim 8 including a third member movable angularly around the axle in response to said axial movement of the second member, said spring means being arranged to resist said angular movement of said third member.

10. The invention according to claim 9 including second screw set means between said second member and said third member causing angular movement of said third member, the second screw thread means having a different helix angle from the screw thread means so as to vary the ratio of movement between said members.

11. The invention according to claim 9 wherein the spring means is adjustable so as to vary the amount of torque necessary to move said first member to a predetermined position.

12. The invention according to claim 9 wherein the third member includes a portion projecting outwardly from an end of the hollow interior of the hub, which end is opposite to said sprocket set.

13. The invention according to claim 12 wherein the spring means is mounted exteriorally of the hub and is connected to said outwardly projecting portion.

14. The invention according to claim 12 wherein the third member comprises a sleeve inside the hollow interior of the hub with an end face of the sleeve exposed at said opposed end of the hollow interior.

15. The invention according to claim 14 including main rotation bearings between said sleeve and said hub and subsidiary bearings between said sleeve and a bearing support member on the axle.

16. The invention according to claim 1 wherein the drive sprocket means includes a plurality of drive sprockets coaxially mounted and axially spaced and drive sprocket change means for moving the chain from one drive sprocket to each of the other drive sprockets, and means communicating force from said gear change means to said drive sprocket change means arranged so as to move the chain from a first drive sprocket to a next adjacent drive sprocket subsequent to a change from a first chain sprocket to at least one of the further change sprockets.

17. The invention according to claim 16 including a member movable axially in response to said movement, said member being operable to cause movement of said gear change means, wherein the member includes screw thread means thereon cooperating with screw thread means on the projecting portion for causing said axial movement of said member, including a third member movable angularly around the axle in response to said axial movement of the second member, said spring means being arranged to resist said angular movement of said third member.

18. The invention according to claim 17 including a connector member mounted on said outwardly projecting portion and rotatable therewith through an angle less than 360°, the connecting member having said spring means attached thereto and including a camtrack thereon for connection to a cable for communicating force from said connecting member to said drive sprocket change means.

19. The invention according to claim 18 wherein the connecting member is rotatable through 90° and wherein the camtrack is rotatable with the connecting member around the axle to cause movement of the chain from one drive sprocket to another of the drive sprockets.

20. The invention according to claim 19 wherein the camtrack is V shaped defining three points along its length each cooperating with a respective one of three drive sprockets.

* * * * *